(12) United States Patent
Yach et al.

(10) Patent No.: US 8,306,534 B2
(45) Date of Patent: Nov. 6, 2012

(54) SERVICE STATUS DISPLAY ON A HANDHELD COMMUNICATION DEVICE

(75) Inventors: David Yach, Waterloo (CA); Sherryl Lee Lorraine Scott, Toonto (CA)

(73) Assignee: Research In Motion Limited, Waterloo, Ontario (CA)

( * ) Notice: Subject to any disclaimer, the term of this patent is extended or adjusted under 35 U.S.C. 154(b) by 1245 days.

(21) Appl. No.: 11/681,448

(22) Filed: Mar. 2, 2007

(65) Prior Publication Data

US 2008/0214191 A1    Sep. 4, 2008

(51) Int. Cl.
H04W 4/00 (2009.01)
(52) U.S. Cl. ............... 455/435.2; 455/435.1; 455/435.3; 455/436; 455/437; 455/157.2; 370/312
(58) Field of Classification Search ............... 455/435.2, 455/432.1; 370/312
See application file for complete search history.

(56) References Cited

U.S. PATENT DOCUMENTS

| | | | |
|---|---|---|---|
| 5,881,370 A * | 3/1999 | Pottala et al. ................. | 455/78 |
| 6,181,710 B1 | 1/2001 | Cooper et al. | |
| 6,216,001 B1 | 4/2001 | Ghirhikar et al. | |
| 6,438,390 B1 | 8/2002 | Awan | |
| 6,522,894 B1 * | 2/2003 | Schmidt ..................... | 455/552.1 |
| 6,529,527 B1 | 3/2003 | Chen et al. | |
| 6,826,400 B1 * | 11/2004 | Cashman et al. ............. | 455/434 |
| 7,024,222 B2 | 4/2006 | Gorsuch | |
| 2004/0203674 A1 | 10/2004 | Shi | |
| 2005/0032516 A1 * | 2/2005 | Marchevsky ............. | 455/426.2 |
| 2005/0111394 A1 * | 5/2005 | Jung et al. ..................... | 370/312 |
| 2006/0234762 A1 * | 10/2006 | Ozluturk .................... | 455/552.1 |
| 2009/0215447 A1 * | 8/2009 | Catalano et al. ........... | 455/432.1 |
| 2009/0291682 A1 * | 11/2009 | Muller ........................ | 455/432.1 |
| 2010/0159959 A1 * | 6/2010 | Santhanam et al. .......... | 455/458 |
| 2010/0227641 A1 * | 9/2010 | Muller ....................... | 455/552.1 |

FOREIGN PATENT DOCUMENTS

| | | |
|---|---|---|
| EP | 1395077 A1 | 3/2004 |
| WO | 0131954 A1 | 5/2001 |
| WO | 02104051 A1 | 12/2002 |
| WO | WO2006136902 | 12/2006 |

OTHER PUBLICATIONS

"Bedienungsanleitung XDA Neo" Internet Citation, [Online] Mar. 2006, pp. 9-21, XP002442237 pp. 11, 17, 18.
Research in Motion Ltd: "Getting Started Guide, BlackBerry 8800 Smartphone" Internet Citation, [Online] Feb. 12, 2007, XP002442243 pp. 15, 19-23.

* cited by examiner

Primary Examiner — Kamran Afshar
Assistant Examiner — Shahriar Behnamian
(74) Attorney, Agent, or Firm — McCarthy Tétrault LLP

(57) ABSTRACT

A method of indicating the availability of a communication service begins by receiving, at a handheld communication device, a service indication of an availability of one of a plurality of communication services, via a wireless communication mode, to the communication device. The handheld communication device receives the service indication from a provider of the one communication service via a wireless non-traffic channel of the wireless communication mode. The communication device then provides a user-indication of the communication service availabilities in accordance with the received service indication.

17 Claims, 8 Drawing Sheets

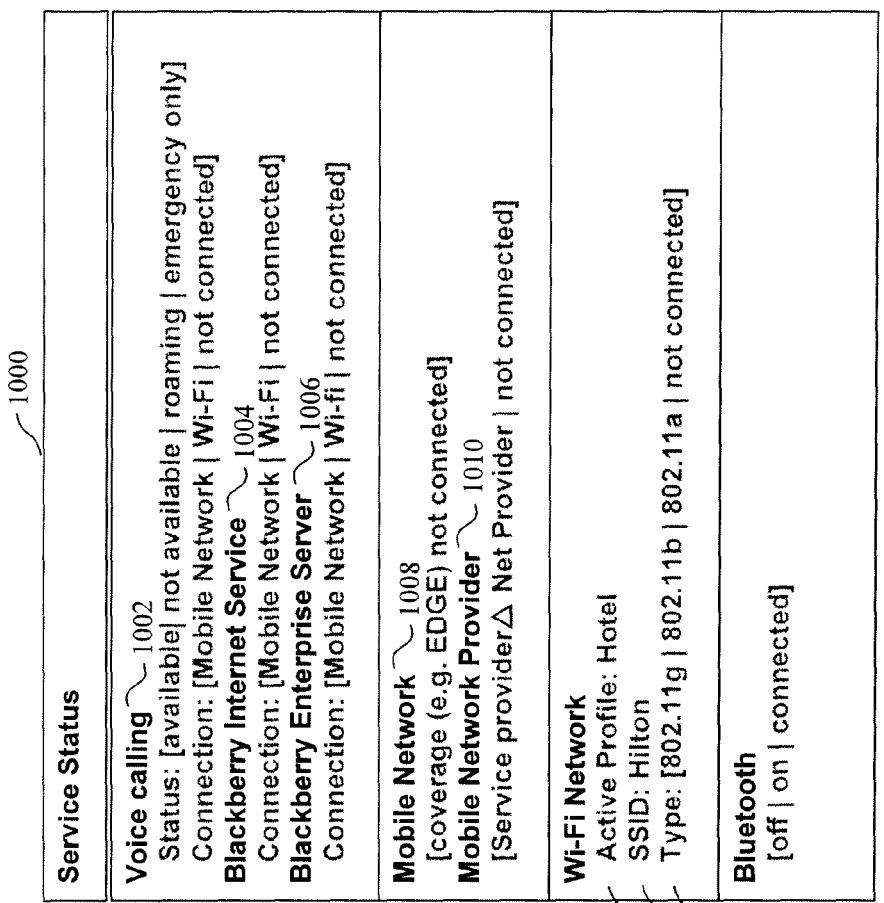
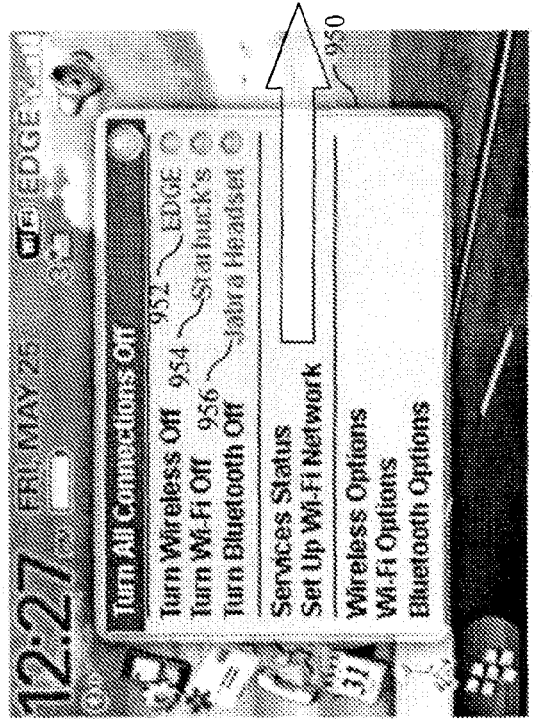
FIG. 7A
FIG. 7B

SERVICE STATUS DISPLAY ON A HANDHELD COMMUNICATION DEVICE

FIELD OF THE INVENTION

The invention described herein relates to a handheld communication device that is capable of communicating with different communication services.

BACKGROUND OF THE INVENTION

Modern handheld communication devices are configured with multiple wireless transceivers which provide the device with multiple wireless communication modes. For instance, a handheld communication device could be configured for voice communication over a Global System for Mobile Communications (GSM) network, and data communication with Bluetooth peripheral devices. A handheld computing device could be configured for data communication over both a General Packet Radio Service/Enhanced Data rates for GSM Evolution (GPRS/EDGE) network and a local WiFi (IEEE 802.11x) network.

Configuring a single communication device to communicate with different communication services obviously enhances the versatility of the device. However, this enhanced versatility can be problematic since the user often has limited control over the communication services that are available at any given time. As a result, the user might expect the device to be communicating over a free WiFi network, when, in fact, the device is actually communicating over a billable GSM network. Similarly, the user might expect the device to be communicating over a high-speed short-range WiFi network, when, in fact, the device has moved out of range of the WiFi network and is actually communicating over a low-speed long-range GPRS/EDGE network.

Shi (US 2004/0203674) describes a wireless communication device that displays detailed information concerning voice and data calls that are in progress. The detailed information includes caller name, caller number, duration, data rate, connection status, and service type. The detailed information is only available when the call is active.

Ghirhikar (U.S. Pat. No. 6,216,001) describes a wireless communication device that is configured to indicate the current service mode to a user of the device. The service modes contemplated are (1) storing service mode in which new messages destined for the device are not received by the device; (2) basic service mode in which the new messages are received by the device; and (3) full service mode in which both new and stored messages are received by the device. The device measures signal quality on forward and reverse traffic channels to transition between the service modes.

Awan (U.S. Pat. No. 6,438,390) describes a cellular telephone that has a LED controller, and a multi-coloured status LED. The LED controller controls the sequence of flashes and the flash colour of the LED to indicate the status of the device. Possible status indicators include no service, in-service, roaming and message waiting.

Gorsuch (U.S. Pat. No. 7,024,222) describes a wireless communication device that automatically connects to a short-range, high-speed wireless (IEEE 802.11) LAN when such a connection is available, and automatically switches to a long-range, lower speed wireless (CDMA) LAN when the device is out of range of the high-speed LAN. LAN detection is performed either by (1) passively detecting the presence of a beacon signal or (2) transmitting a probe request message and receiving a response indicating the presence of the LAN. LAN switching is performed without notification to the user.

BRIEF DESCRIPTION OF THE DRAWINGS

The invention will now be described, by way of example only, with reference to the accompanying drawings, in which:

FIGS. 7a and 7b are screenshots that depict sample user-indications of available communication services and communication modes.

DETAILED DESCRIPTION OF THE PREFERRED EMBODIMENT

Figure 1:
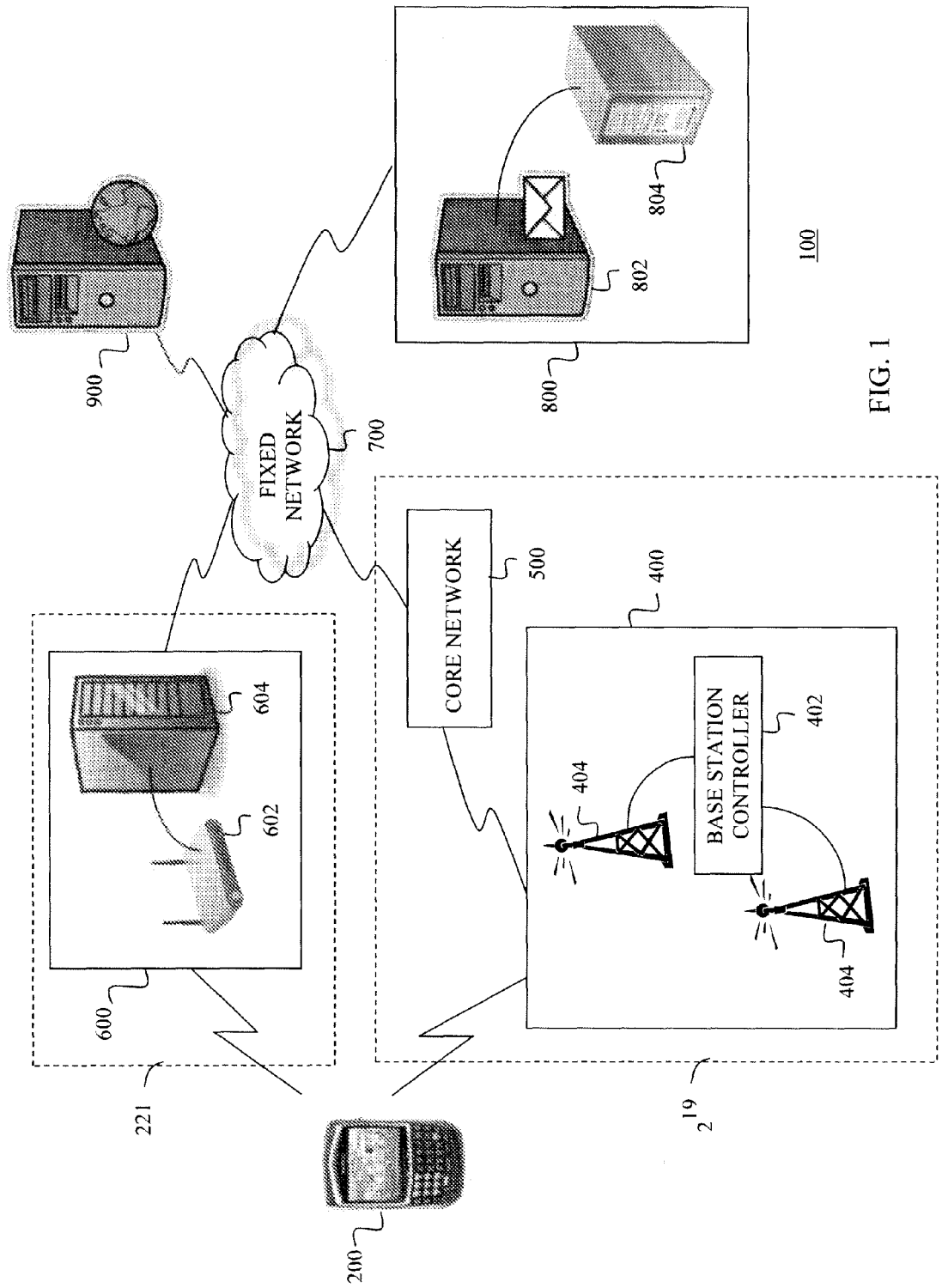
FIG. 1 is a schematic diagram depicting a communications network, including a handheld communications device according to the invention.

According to the invention described herein, a handheld communication device determines the communication services that are available to the communication device without opening a traffic channel with a provider of the communication services, and provides an indication of the available communication services to a user of the communication device.

In accordance with a first aspect of the invention, there is provided a method of providing a user-indication of communication service that are available to a handheld communication device. The method, according to this first aspect of the invention, begins by receiving, at the handheld communication device, a service indication of one of a plurality of communication services, via one of a plurality of wireless communication modes, to the communication device. The handheld communication device receives the service indication from a provider of the one communication service via a wireless non-traffic channel of the one wireless communication mode. The communication device then provides a user-indication of the communication service availabilities in accordance with the received service indication.

In accordance with a second aspect of the invention, there is provided a wireless communications device that is configured to provide a user-indication of communication services that are available to the communication device. The wireless communications device, according to this second aspect of the invention, comprises service authorization means, and communication mode indicating means in communication with the service authorization means.

The service authorization means is configured receive a service indication of an availability of one of a plurality of communication services, via one of a plurality of wireless communication modes, to the communication device. The communication device receives the service indication from a provider of the one communication service via a wireless non-traffic channel of the one wireless communication mode. The communication mode indicating means is configured to provide a user-indication of the communication service availabilities in accordance with the received service indication.

In accordance with a third aspect of the invention, there is provided a computer readable medium that carries processing instructions for an electronic communications device. The processing instructions, when executed by a computer processor of the communications device, enables the device to provide a user-indication of communication services that are available to the communication device.

The method, according to this third aspect of the invention, begins by receiving, at the communication device, a service indication of an availability of one of a plurality of communication services, via one of a plurality of wireless communication modes, to the communication device. The communication device receives the service indication from a provider of the one communication service via a wireless non-traffic channel of the one wireless communication mode. The communication device then provides a user-indication of the communication service availabilities in accordance with the received service indication.

In a preferred implementation, the communication service is available to the communication device via the communication mode, and the user-indication comprises a user-indication of the communication mode for the available communication service. Preferably, the communication device is configured to receive a plurality of the communication services, and to communication over a plurality of the communication modes, and the communication mode user-indication comprises a graphical information screen depicting a table specifying the communication mode over which each communication service is available to the communication device.

Also, in the preferred implementation, the available communication modes comprise a high-speed short-range communication protocol, and a low-speed long-range communication protocol, and the communication services comprise data communication services and/or voice telephony services.

FIG. 1 is a schematic view of a communications network, denoted generally as 100. The communications network 100 is shown comprising at least one wireless communications device 200, and a wireless communications network and a wired communications network both in communication with the wireless communications devices 200. The wireless communications network comprises a primary wireless network 219 and a secondary wireless network 221. In the embodiment shown, the primary wireless network comprises a long-range cellular network, and the secondary wireless network comprises a short range local area wireless network. However, the wireless communications network is not limited to any particular number or configuration of wireless networks. For instance, the primary and secondary wireless networks 219, 221 may both comprise long-range cellular networks, or short range wireless networks. Further, the wireless communications network may comprises a plurality of long-range cellular networks and/or a plurality of short range wireless networks.

As shown, the long-range wireless cellular network 219 comprises a plurality of remote base station subsystems (BSSs) 400, and a core network 500 in communication with the BSSs 400. The short-range local area network 221 comprises at least one local wireless node 600. The wired communications network comprises at least one e-mail service 800, at least one web server 900, and a fixed network 700 in communication with the long-range wireless cellular network 219, the short-range local area network 221, the e-mail services 800 and the web servers 900.

The BSSs 400 of the long-range wireless cellular network 219 communicate with the core network 500 via a wired or optical link, and provide a bridge between the wireless communications devices 200 and the core network 500.

As shown, each BSS 400 includes a Base Station Controller (BSC) 402 and a plurality of Base Transceiver Stations (BTSs) 404. Each BTS 404 includes one or more radio transceivers, the coverage area of each defining a long-range radio system cell. Preferably, the BTSs 404 are configured to communicate with the wireless communications devices 200 over the radio system cells via a long-range wireless communications protocol, such as GSM and/or Code Division Multiple Access (CDMA). However, the BSSs 404 may implement other long-range communication protocols.

Each BTS 404 is connected to the BSC 402 via a wired or optical link. The BSC 402 acts as a physical connection between the handheld communications device 200 and the core network 500.

Preferably, the core network 500 facilitates digital communication between the handheld communications devices 200 and the fixed network 700. Preferably, the core network 500 implements data (e.g. GPRS/EDGE) and/or telephony communications protocols. The core network 500 communicates with the fixed network 700 via a wired or optical link, and acts as switching node to the fixed network 700. Typically, the fixed network 700 comprises a Public Switched Telephone Network (PSTN) or an Integrated Services Digital Network (ISDN).

The local wireless node 600 of the short-range wireless local area network 221 communicates with the fixed network 700 via a wired or optical link, and provides a bridge between the local wireless communications devices 200 and the fixed network 700. As shown, the local wireless node 600 includes a wireless base station 602, and a local base station controller 604 coupled to the wireless base station 602.

The base station 602 includes one or more radio transceivers, the coverage area of each defining a local area cell. Preferably, the base station 602 communicates with the local wireless communications devices 200 over the local area cell via a short-range wireless communications protocol, such as IEEE 802.11x and/or Bluetooth. However, the wireless base station 602 may implement other short-range wireless communications protocols.

The base station 602 is connected to the local base station controller 604 via a wired or optical link. The local base station controller 604 acts as a physical connection between the handheld communications device 200 and the fixed network 700, and facilitates digital communication between the handheld communications devices 200 and the fixed network 700. The local base station controller 604 communicates with the fixed network 700 via a wired or optical link.

The local wireless node 600 may be implemented within a private institution, in which case the local base station controller 604 provides restricted access to the fixed network 700 to only wireless communications devices 200 that are registered users of the local wireless node 600. Alternately, the local wireless node 600 may be implemented at public site, in which case the local base station controller 604 provides unrestricted access to the fixed network 700.

Each e-mail service 800 comprises an e-mail server 802 and an authorization database 804 in communication with the e-mail server 802, and provides e-mail services for the handheld communications devices 200. The e-mail server 802 maintains an e-mail account for each registered user of the e-mail service 800, including the e-mail messages that are sent from and received in each e-mail account. Typically, the e-mail server 802 comprises a Microsoft Outlook Exchange Server, Novell Groupwise Server or other e-mail server solution, configured with a Blackberry Enterprise Server option.

The authorization database 804 includes authorization records for each e-mail account. Typically, the authorization records comprise unique Personal Identification Number (PIN) entries which identify the handheld communications device 200 associated with each e-mail account, and encryption keys which the e-mail server 802 uses for the encrypted delivery of e-mail messages between the e-mail server 802 and the handheld communications devices 200.

Each web server 900 implements a web site having content for rendering on the handheld communications devices 200. Preferably, the web server 900 provides the handheld communications devices 200 with web pages that have limited content. Alternately, or additionally, the web server may serve web pages that are written in WML (Wireless Markup Language).

Figure 2:
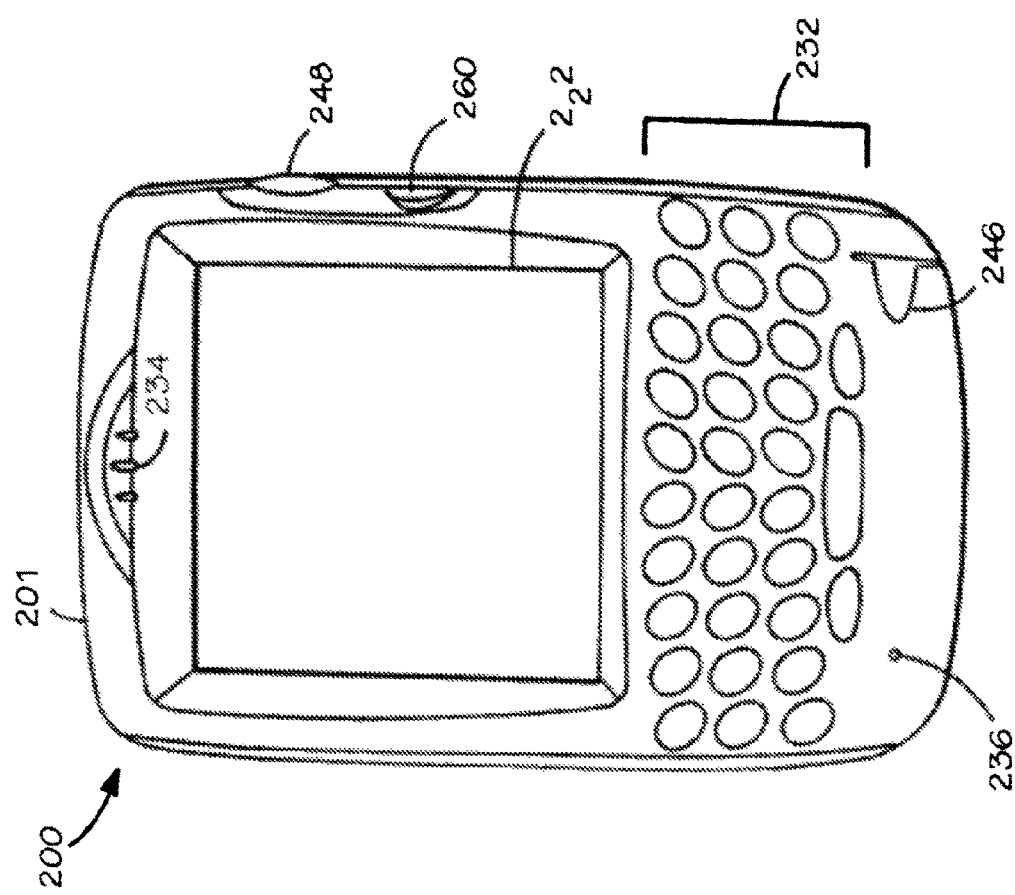
FIG. 2 is a front plan view of the handheld communications device depicted in FIG. 1.

Referring now to FIG. 2, there is shown a sample handheld communications device 200 in accordance with the invention. Preferably, the handheld communications device 200 is a two-way wireless communications device having at least voice and data communication capabilities, and is configured to operate within the wireless cellular network 219 and/or the local area wireless network 221. Further, preferably the handheld communications device 200 has the capability to communicate with other computer services that are available via the Internet, such as the e-mail service 800 and the web server 900. Depending on the exact functionality provided, the wireless handheld communications device 200 may be referred to as a data messaging device, a two-way pager, a wireless e-mail device, a cellular telephone with data messaging capabilities, a wireless Internet appliance, or a data communication device, as examples.

As shown, the handheld communications device 200 includes a display 222, a function key 246, and data processing means 202 (not shown) disposed within a common housing 201. The display 222 comprises a backlit LCD display. The data processing means 202 is in communication with the display 222 and the function key 246. In one implementation, the backlit display 222 comprises a transmissive LCD display, and the function key 246 operates as a power on/off switch. Alternately, in another implementation, the backlit display 222 comprises a reflective or trans-reflective LCD display, and the function key 246 operates as a backlight switch.

In addition to the display 222 and the function key 246, the handheld communications device 200 includes user data input means for inputting data to the data processing means 202. As shown, preferably the user data input means includes a keyboard 232, a thumbwheel 248 and an escape key 260. The keyboard 232 includes alphabetic and numerical keys, and preferably also includes a "Send" key and an "End" key to respectively initiate and terminate voice communication. However, the data input means is not limited to these forms of data input. For instance, the data input means may include a trackball or other pointing device instead of (or in addition to) the thumbwheel 248.

Further, preferably the handheld communications device 200 includes a LED (not shown) and vibrator (not shown) that are coupled to the data processing means 202 and respectively provide a visual and tactile notification of an notification event to the user of the handheld communications device 200. Possible notification events suitable for notification by the LED and/or vibrator include a user notification of an incoming e-mail message, text message and/or a telephone call. Further, as will be discussed below, another possible notification event suitable for notification by the LED and/or vibrator is a notification that one or more wireless communication modes are available and/or have become unavailable to the handheld communications device 200.

Figure 3:
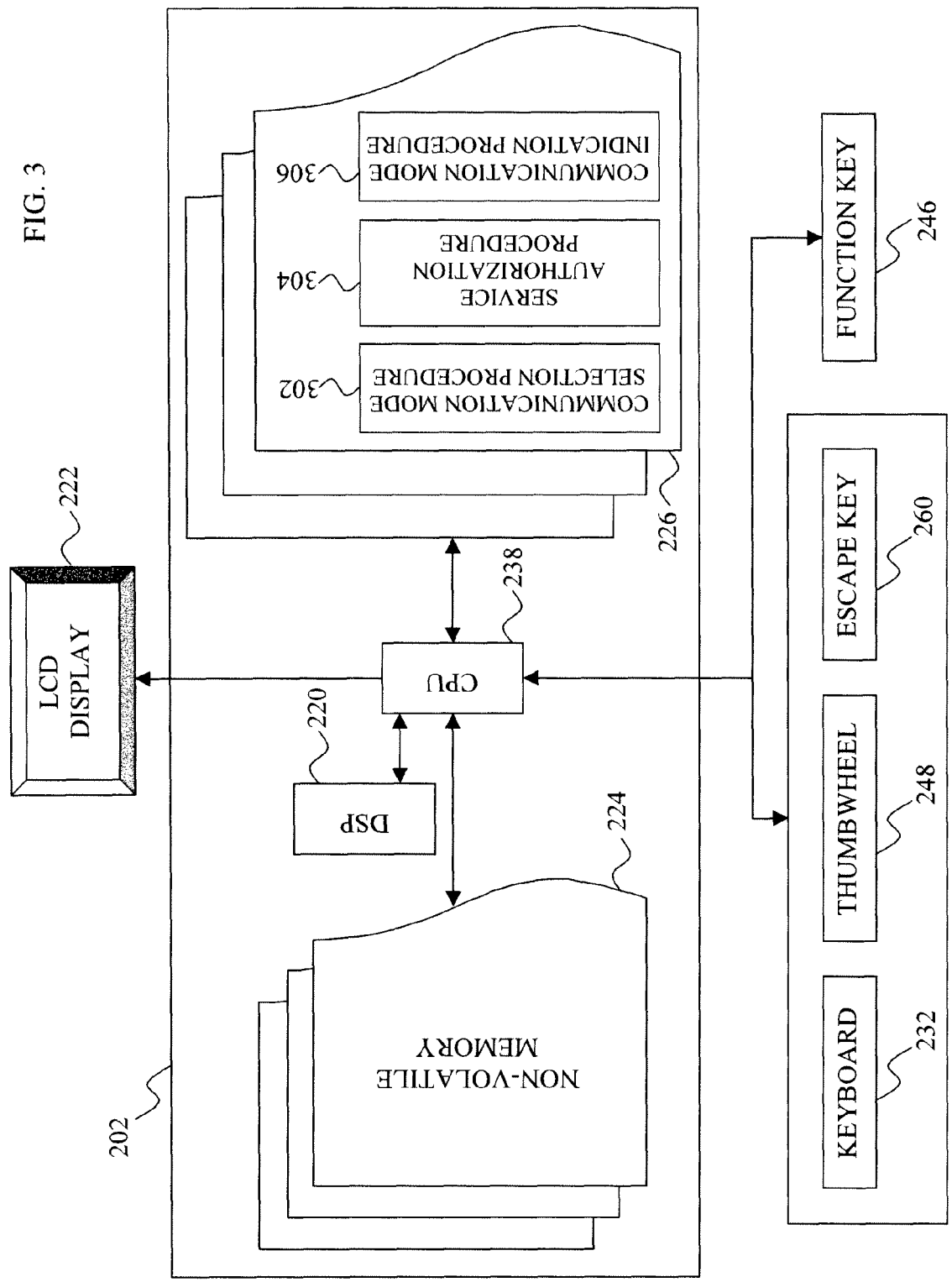
FIG. 3 is a schematic diagram depicting certain functional details of the data processing means of the handheld communications device, including the service authorization procedure, and the communication mode indicating procedure.

As shown in FIG. 3, the data processing means 202 comprises a microprocessor 238 in communication with flash memory 224 and volatile memory (RAM) 226. The flash memory 224 includes computer processing instructions which, when executed by the microprocessor 238, implement an operating system, computer programs, and operating system specific applications. The operating system includes an Open Systems Interconnection (OSI) communication protocol stack that allows the handheld communications device 200 to send and receive communication signals over the wireless cellular network 219 and the local area wireless network 221. Alternately, the computer processing instructions may be copied from the flash memory 224 into the RAM 226 upon system reset or power-up, and executed by the microprocessor 238 out of the RAM 226.

The communication protocol stack of the operating system includes a communication mode determination procedure 302, a service authorization procedure 304, and a communication mode indication procedure 306. The functions of the communication mode determination procedure 302, the service authorization procedure 304, and communication mode indication procedure 306 will be discussed in greater detail below. However, it is sufficient at this point to note that the communication mode indication procedure 306 is in communication with the communication mode determination procedure 302 and the service authorization procedure 304, and that the service authorization procedure 304 and the communication mode indication procedure 306 together comprise a method that indicates the modes of wireless communication over which the communication services are available to the handheld communications device 200.

It should also be understood that although the communication mode determination procedure 302, the service authorization procedure 304 and communication mode indication procedure 306 are preferably implemented as a set of computer processing instructions, these procedures may be implemented in electronics hardware instead.

Figure 4:
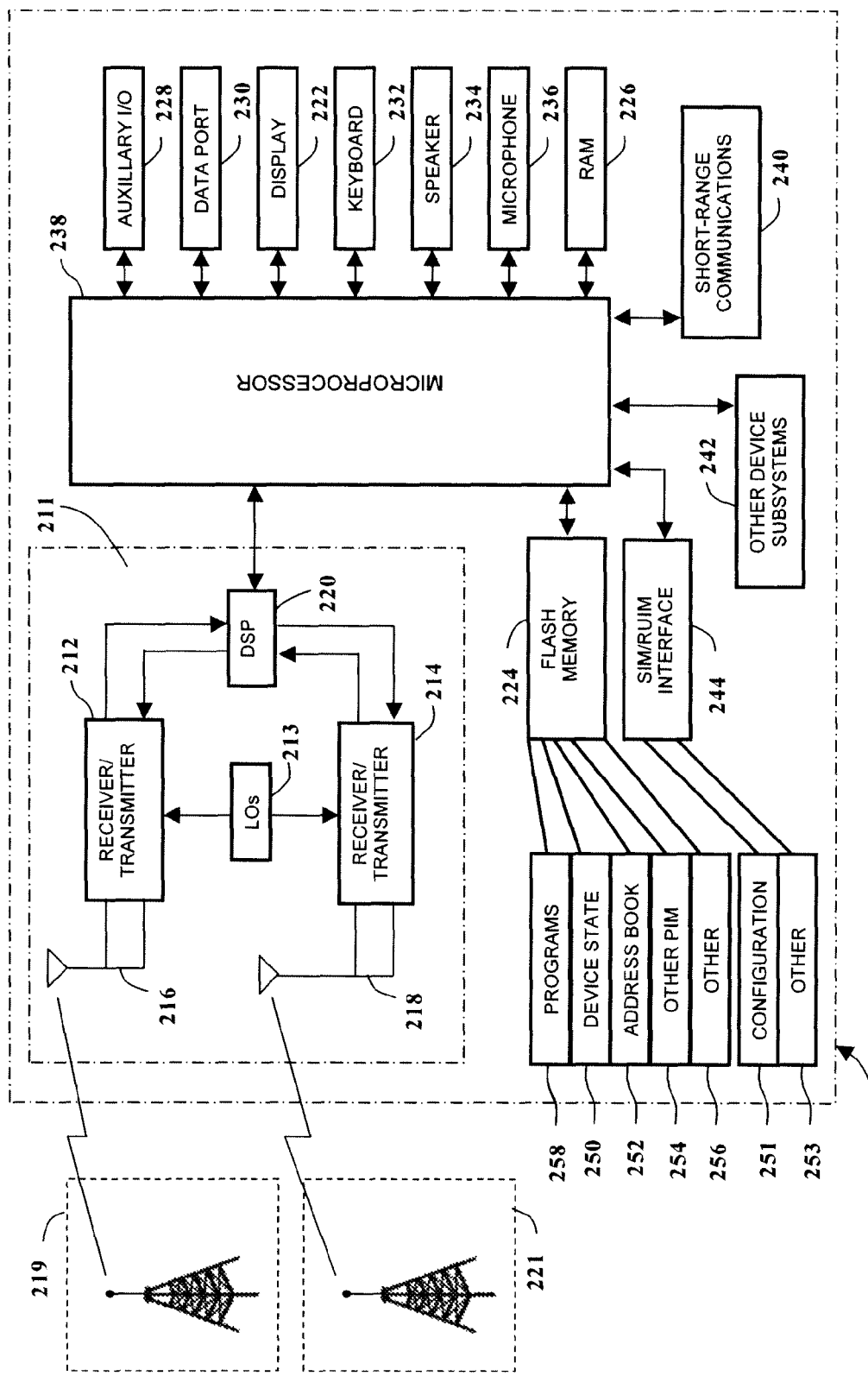
FIG. 4 is a schematic diagram depicting certain additional functional details of the handheld communications device.

FIG. 4 depicts functional details of the handheld communications device 200. As shown, the handheld communications device 200 incorporates a motherboard that includes a communication subsystem 211, and the microprocessor 238. Further, the communications device 200 also includes a SIM interface 244 if the handheld communications device 200 is intended for use within a GSM network, and/or a RUIM interface 244 if the handheld communications device 200 is intended for use within a CDMA network. The communication subsystem 211 performs communication functions, such as data and voice communications, and includes a primary transmitter/receiver 212, a secondary transmitter/receiver 214, a primary internal antenna 216 for the primary transmitter/receiver 212, a secondary internal antenna 218 for the secondary transmitter/receiver 214, and local oscillators (LOs) 213 and one or more digital signal processors (DSP) 220 coupled to the transmitter/receivers 212, 214.

The communication subsystem 211 sends and receives wireless communication signals over the wireless cellular network 219 via the primary transmitter/receiver 212 and the primary internal antenna 216. The communication subsystem 211 also sends and receives wireless communication signals over the local area wireless network 221 via the secondary transmitter/receiver 214 and the secondary internal antenna 218.

Signals received by the primary internal antenna 216 from the wireless cellular network 219 are input to the receiver section of the primary transmitter/receiver 212, which performs common receiver functions such as frequency down conversion, and analog to digital (A/D) conversion, in preparation for more complex communication functions performed by the DSP 220. Signals to be transmitted over the wireless cellular network 219 are processed by the DSP 220 and input to transmitter section of the primary transmitter/receiver 212 for digital to analog conversion, frequency up conversion, and transmission over the wireless cellular network 219 via the primary internal antenna 216.

Similarly, signals received by the secondary internal antenna 218 from the local area wireless network 221 are input to the receiver section of the secondary transmitter/receiver 214, which performs common receiver functions such as frequency down conversion, and analog to digital (A/D) conversion, in preparation for more complex communication functions performed by the DSP 220. Signals to be transmitted over the local area wireless network 221 are processed by the DSP 220 and input to transmitter section of the secondary transmitter/receiver 214 for digital to analog conversion, frequency up conversion, and transmission over the local area wireless network 221 via the secondary internal antenna 218. As discussed above, the communication subsystem 211 may include more than one DSP 220, in which case the signals transmitted and received by the secondary transmitter/receiver 214 would preferably be processed by a different DSP than the primary transmitter/receiver 212.

The SIM/RUIM interface 244 is similar to a card-slot into which a SIM/RUIM card can be inserted and ejected like a diskette or PCMCIA card. The SIM/RUIM card holds many key configurations 251, and other information 253 including subscriber identification information, such as the International Mobile Subscriber Identity (IMSI) that is associated with the handheld communications device 200, and subscriber-related information, such as the unique PIN that is assigned to the handheld communications device 200.

The microprocessor 238 controls the overall operation of the device, interacting with device subsystems such as the display 222, flash memory 224, RAM 226, auxiliary input/output (I/O) subsystems 228, data port 230, keyboard 232, speaker 234, microphone 236, short-range communications subsystem 240, and device subsystems 242. The data port 230 may comprise a RS-232 port, a Universal Serial Bus (USB) port or other wired data communication port.

As shown, the flash memory 224 includes both computer program storage 258 and program data storage 250, 252, 254 and 256. Computer processing instructions are preferably also stored in the flash memory 224 or other similar non-volatile storage. Other computer processing instructions may also be loaded into a volatile memory such as RAM 226. The computer processing instructions, when accessed from the memory 224, 226 and executed by the microprocessor 238 define the operating system, computer programs, operating system specific applications. The computer processing instructions may be installed onto the handheld communications device 200 upon manufacture, or may be loaded through the wireless network 219, the auxiliary I/O subsystem 228, the data port 230, the short-range communications subsystem 240, or the device subsystem 242.

The operating system allows the handheld communications device 200 to operate the display 222, the auxiliary input/output (I/O) subsystems 228, data port 230, keyboard 232, speaker 234, microphone 236, short-range communications subsystem 240, and device subsystems 242. One function implemented by the operating system is to display information on the display 222. Typically, the computer programs include communication software that configures the handheld communications device 200 to receive one or more communication services. For instance, the communication software may include internet browser, e-mail and telephone software that respectively allow the handheld communications device 200 to communicate with various computer servers over the internet, send and receive e-mail, and initiate and receive telephone calls.

In data communication mode, a received text message or web page download will be processed by the communication subsystem 211 and output to the display 222, or alternatively to an auxiliary I/O device 228. A user of the handheld communications device 200 may compose data items such as email messages for example, using the keyboard 232. Such composed items may then be transmitted over the wireless cellular network 219 or the local area wireless network 221 through the communication subsystem 211.

For voice communications, overall operation of the handheld communications device 200 is similar, except that received signals would preferably be output to the speaker 234 and signals for transmission would be generated by a microphone 236. Further, the display 222 may provide an indication of the identity of a calling party, the duration of a voice call, or other voice call related information for example.

Figure 5:
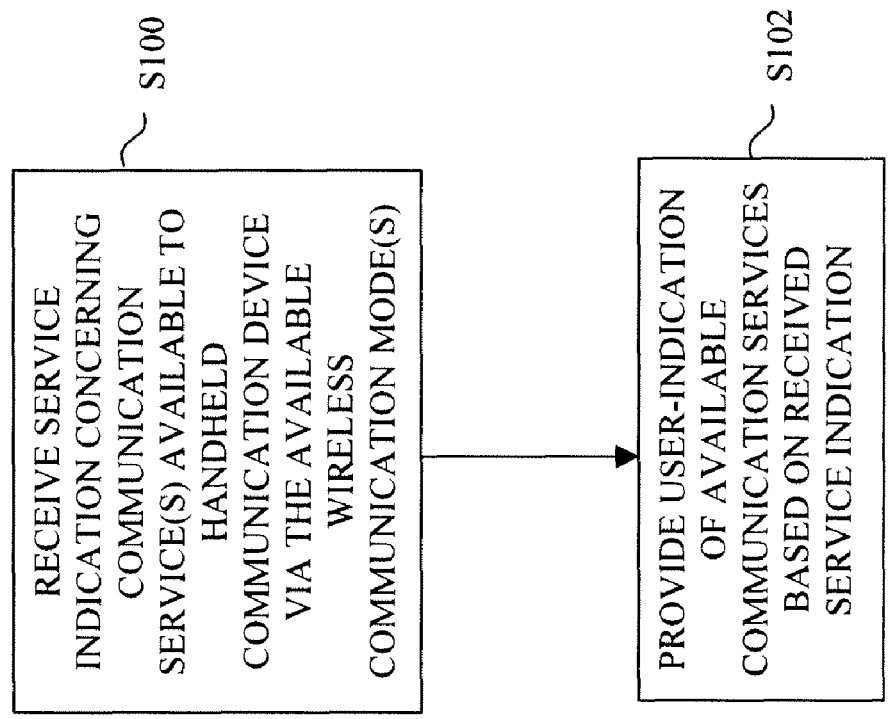
FIG. 5 is a flow chart depicting, by way of overview, the method performed by the handheld communications device when providing a user-indication of communication services that are available to the handheld communication device.

FIG. 5 is a flow chart that depicts, by way of overview, the method implemented in the handheld communications device 200 for indicating the communication services that are available to the handheld communications device 200. The communication device 200 is configured to receive wireless communication services via at least one mode of wireless communication.

At step S100, the handheld communications device 200 receives a service indication concerning the communication service(s) that is/are available to the handheld communication device 200 via the wireless communication mode(s) that are available to the handheld communication device 200. In the example shown in FIG. 1, the communication services comprise the e-mail service 800 and the web server 900. However, the invention is not limited to any particular services. For instance, in one variation, the communications network 100 includes a telephony service, a text messaging service, a virtual private network (VPN) service, and a global positioning system (GPS)-mapping service. Other quantities and complements of communication services fall within the scope of the invention.

The handheld communication device 200 receives the service indication from a provider of the communication service via a wireless non-traffic channel of the wireless communication mode. In the example shown in FIG. 1, the wireless cellular network 219 comprises one mode of wireless communication, and the local area wireless network 221 comprises another mode of wireless communication. However, the invention is not so limited. For instance, in one variation, the communications network 100 includes a plurality of non-overlapping local area wireless networks 221, in which case each local area wireless network 221 comprises a distinct mode of wireless communication.

Based on the service indications that are received by the communication device 200, at step S102 the communication device 200 provides a user-indication of the available communication services based on the received service indication.

Typically, the communication device 200 provides a visual indication of the available communication services via the display 222.

Alternately, or additionally, the LED may be flashed at one rate, and/or with one colour, when the communication device 200 roams into a geographic region that offers a communication mode that was unavailable to the communication device 200 in a prior geographic region. The LED may be flashed at a different rate, and/or with a different colour, when the communication device 200 roams into a geographic region that does not offer a communication mode that was available to the communication device 200 in a prior geographic region.

Further, the communication device 200 may provide a tactile indication of the available communication services, such as via the vibrator. In this latter variation, the vibrator may become activated when the communication device 200 roams into a geographic region that offers a communication mode that was unavailable to the communication device 200 in a prior geographic region. Alternately (or additionally), the vibrator may become activated when the communication device 200 roams into a geographic region that does not offer a communication mode that was available to the communication device 200 in a prior geographic region.

Other user-indications are contemplated by the invention, such as audio indications via the speaker 234. Further, the user indications may comprise combinations of two or more of the foregoing notification modes.

Figure 6A:
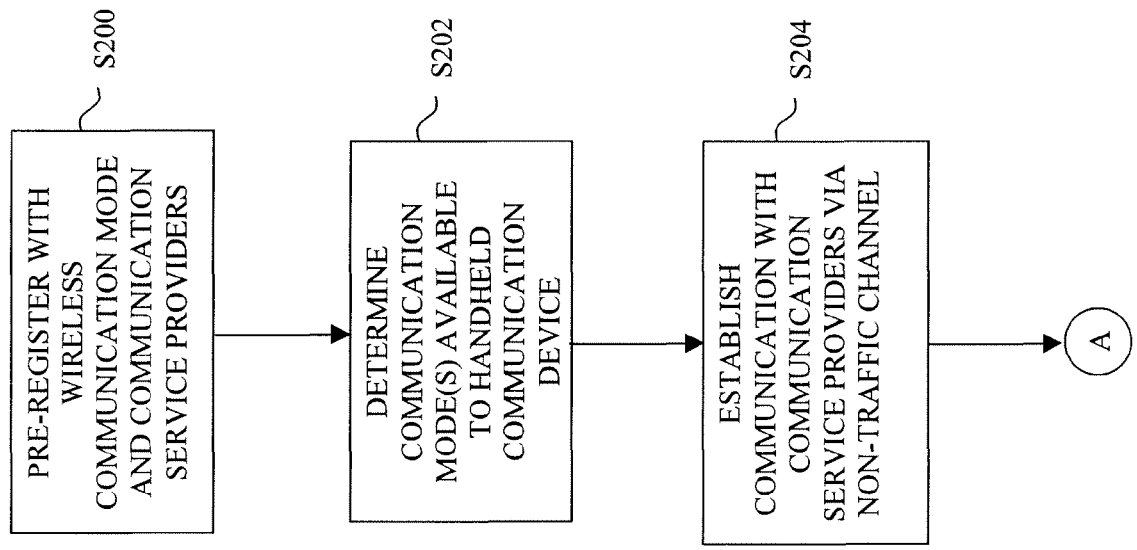
FIG. 6 (comprising FIGS. 6a to 6b) is a flow chart depicting, in detail, the method performed by the handheld communications device when providing the user-indication of available communication services.
Figure 6B:
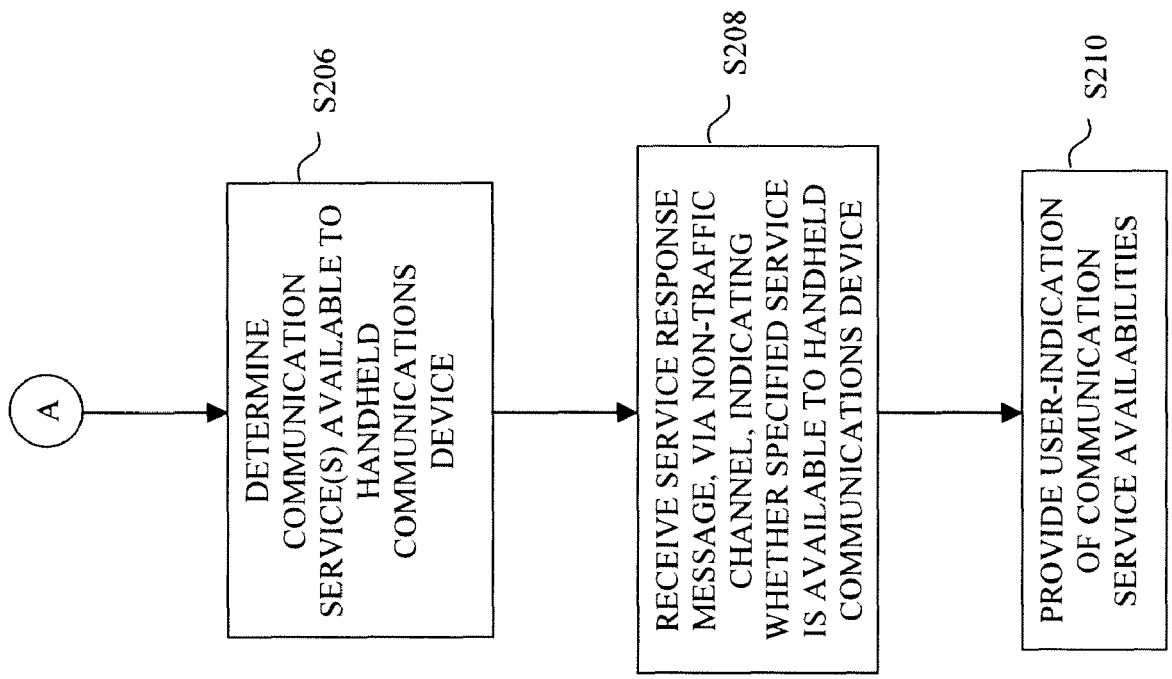

FIG. 6 depicts, in detail, the sequence of steps performed by the handheld communications device 200 when indicating the communication modes over which the communication services are available to the communication device 200. Initially, the user of the handheld communications device 200 pre-registers to have access to one or more wireless communications modes, if required. For instance, typically a user must pre-register (i.e. subscribe to a wireless coverage plan) to have access to the wireless cellular network 219. Alternately, however, typically a user need not pre-register to have access to the local area wireless network 221.

Initially, the user of the handheld communications device 200 also pre-registers to have access to one or more services on the handheld communications device 200. In the example shown in FIG. 1, the communication services comprise the e-mail service 800 and the web server 900. However, as discussed above, the communication services may also include other services, such as a telephony service, a text messaging service, a virtual private network (VPN) service, and/or a global positioning system (GPS)-mapping service.

One or more of these communication services may be pay-for-use services. For instance, the local wireless node 600 might be implemented at a café, in which case the services of the local wireless node 600 might only be available to customers of the café. The e-mail service 800, the telephony service, and the text messaging service may be available only by subscription. Accordingly, at step S200, the user of the handheld communications device 200 pre-registers with the provider of the pay-for-use service(s) prior to gaining access to the service.

The service provider of the pay-for-use service maintain records for each registered user of the pay-for-use communication service. As discussed above, typically the e-mail service 800 maintains these records in the authorization database 804.

Other communication services may be restricted, for security reasons, to certain pre-authorized users. For instance, the web server 900 may comprise a business intranet, which is available only to authorized employees. A business VPN service would also typically be available only to authorized employees. Accordingly, at step S200, the user of the handheld communications device 200 also pre-registers with the provider of the restricted service(s) prior to gaining access to the service. As above, the service provider maintain records for each registered user of the restricted communication service.

Conversely, other communication services may be unrestricted. For instance, the local wireless node 600, the web service 900 and the GPS-mapping service may be publicly available. The user of the handheld communications device 200 would not have to register with the provider of the unrestricted services, at step S200, to gain access to the service.

After the user of the handheld communications device 200 pre-registers with the wireless communication mode and communication service providers (as may be required), the communications device 200 determines the communication modes that are available in the geographical region in which the communications device 200 is currently located. To do so, at step S202 the communication mode selection procedure 302 detects the presence of carrier signals at the primary internal antenna 216 and the secondary internal antenna 218, and then initiates any required handshaking to establish communication protocol parameters.

Further, if required by the detected communication mode (e.g. the wireless cellular network 219), the communication mode selection procedure 302 initiates registration with the detected communication mode by transmitting subscriber information to the communication mode provider. If the user of the handheld communications device 200 is authorized to use the detected communication mode, the communication mode provider responds to the communication mode selection procedure 302 with a confirmatory notice.

The communication mode selection procedure 302 then notifies the service authorization procedure 304 of the confirmed communication modes.

For instance, if the wireless cellular network 219 is a GSM network, and the handheld communications device 200 has recently powered up, the communication mode selection procedure 302 registers with GSM network by transmitting the IMSI of the handheld communications device 200 to the GSM network provider. If the user of the handheld communications device 200 is authorized to use the detected communication mode, the network provider responds to the IMSI with a Temporary Mobile Subscriber Identity (TMSI).

Once the handheld communications device 200 has registered with the detected communication modes (if required), at step S204 the service authorization procedure 304 establishes communication with the communication service providers that provide the communication services for which the handheld communications device 200 is configured with communication software. The service authorization procedure 304 then requests information concerning the availability of the associated communication services at the handheld communications device 200.

For instance, if the handheld communications device 200 is configured with telephony communication software, the service authorization procedure 304 requests information from the provider of the telephony services indicating whether the user of the communications device 200 is authorized to have telephony services at the communications device 200. If the handheld communications device 200 is configured with e-mail communication software, the service authorization procedure 304 requests information from the provider of the e-mail service 800 indicating whether the user of the communications device 200 is authorized to receive e-mail services at the communications device 200.

Typically, the service information request includes an indication of the communication service for which the availability is requested. Preferably, the service information request for pay-for-use and restricted services also includes subscriber identification information (e.g. the PIN) that is associated with the user of the handheld communications device 200.

The communication pathway with the communication service providers varies with the confirmed communication modes, as received from the communication mode selection procedure 302. For instance, if the only wireless communication mode that is available to the handheld communications device 200 is the wireless cellular network 219, the service authorization procedure 304 establishes communication with the service providers via the wireless cellular network 219. In this case, at step S204 preferably the service authorization procedure 304 issues the service information requests over a non-traffic channel of the wireless cellular network 219.

If the only wireless communication mode that is available to the handheld communications device 200 is the local area wireless network 221, the service authorization procedure 304 establishes communication with the service providers via the local area wireless network 221. In this case, at step S204 preferably the service authorization procedure 304 issues the service information requests over a non-traffic channel of the local area wireless network 221.

Further, if the handheld communications device 200 is able to communicate over both the wireless cellular network 219 and the local area wireless network 221, to reduce communication costs preferably the service authorization procedure 304 establishes communication with the service providers via the local area wireless network 221. In this case, at step S204 preferably the service authorization procedure 304 issues the service information requests over a non-traffic channel of the local area wireless network 221.

Upon receipt of the service information requests, at step S206 the service provider(s) determines the communication service(s) that are available to the handheld communications device 200. To do so, the service provider verifies that the service is online. Further, in the case of a pay-per-use service and a restricted service, the service provider queries its records of registered users with the received subscriber identification information to determine if the handheld communications device 200 that issued the service information request is authorized to receive the specified service(s).

At step S208, the service provider responds to the service authorization procedure 304 with a service response message indicating whether the specified service is available to the handheld communications device 200. Preferably, the service provider issues the service response message via a non-traffic channel of the wireless communication mode over which the service authorization procedure 304 issued the service information request. With this approach, the service response message implicitly indicates the wireless communication mode (if any) over which the specified service is available to the handheld communications device 200.

The service authorization procedure 304 notifies the communication mode indication procedure 306 of the confirmed communication service(s), together with the associated confirmed communication modes. At step S210, the communication mode indication procedure 306 provides a user-indication of the communication service availabilities based on the service response messages that are received by the service authorization procedure 304. Preferably, the user-indication of communication service availability explicitly indicates the wireless communication mode over which the specified service is available to the handheld communications device 200.

For instance, if the handheld communications device 200 issued the service information request over the wireless cellular network 219, at step S208 the service provider issues the service response message over the wireless cellular network 219. If the specified service(s) was online and available to the handheld communications device 200, the service response message would indicate that the service that was specified in the service information request was available to the handheld communications device 200. Therefore, the user-indication of communication service availability would explicitly indicate that the specified service was available to the handheld communications device 200 via the wireless cellular network 219.

If the handheld communications device 200 issued the service information requests over the local area wireless network 221, at step S208 the service provider issues the service response message over the local area wireless network 221. If the specified service(s) was online and available to the handheld communications device 200, the service response message would indicate that the service that was specified in the service information request was available to the handheld communications device 200. Therefore, the user-indication of communication service availability would explicitly indicate that the specified service was available to the handheld communications device 200 via the local area wireless network 221.

Conversely, if the specified service(s) was either not online or not available to the handheld communications device 200, the service response message would indicate that the service that was specified in the service information request was not available to the handheld communications device 200. Therefore, the user-indication of communication service availability would explicitly indicate that the specified service was not available to the handheld communications device 200 via either the wireless cellular network 219 or the local area wireless network 221.

The communications device 200 continuously determines the communication modes that are available in the geographical region in which the communications device 200 is currently located, and periodically notifies the service authorization procedure 304 of any changes in the confirmed communication modes. Therefore, if the handheld communications device 200 moves from a region serviced by one communication mode to another communication mode, the communication mode indication procedure 306 would dynamically update the user-indication of the communication services, at step S210.

For instance, if the handheld communications device 200 moved from a region that was serviced by the wireless cellular network 219 to a region that was serviced by the local area wireless network 221, the communication mode selection procedure 302 would detect the change in carrier signals, register with the local area wireless network 221 (if required), and then notify the service authorization procedure 304 of the change in wireless communication mode at step S202. At step S204, the service authorization procedure 304 requests information concerning the availability of the communication services via the local area wireless network 221. The communication mode indication procedure 306 updates the user-indication of communication service availability, based on the new service response message received by the service authorization procedure 304 at step S208.

Preferably, the communication mode indication procedure 306 generates the user-indication of communication service availability as one or more graphical information screens on the LCD display 222. The graphical information screen, shown in FIG. 7a, comprises a service mode menu 950 that lists the communication modes for which the handheld communications device 200 has communication software. For instance, the service mode menu 950 includes an "EDGE" menu entry 952, a "Starbuck's" menu entry 954, and a "Jabra Headset" menu entry 956 which respectively indicate that the handheld communications device 200 has communication software for EDGE network communication, WiFi network communication, and Bluetooth communication. Further, the menu also includes an icon next to each of the foregoing menu entries which indicates whether each communication mode is available to the handheld communications device 200.

In the menu shown in FIG. 7a, the icon comprise a green circle which indicates that the associated communication mode is available to the handheld communications device 200. A complementary colour, such as red, would indicate that the associated communication mode is not available. However, the invention is not limited to coloured icons. For instance, to accommodate colour blind users, complementary text icons, such as "ON" and "OFF" icons, may be used to indicate that the associated communication mode availability. Further, text icons may be combined with coloured icons to enhance the notification function of the service mode availability.

The graphical information screen, shown in FIG. 7b, which is accessible from the service mode menu of FIG. 7a, provides more detailed information concerning the communication services and modes. As shown, the graphical information screen of FIG. 7b comprises a service status table 1000 that lists the communication services for which the handheld communications device 200 has communication software. For instance, the service status table 1000 includes a "Voice Calling" heading 1002, a "Blackberry Internet Service" heading 1004, and a "Blackberry Enterprise Service" heading 1006 which respectively indicate that the handheld communications device 200 has communication software for voice telephony services, public e-mail/internet services, and corporate e-mail/internet services which are only available to the handheld communications device 200 through the corporation's firewall.

The service status table 1000 also specifies the wireless communication mode(s) (if any) over which each communication service is available to the handheld communications device 200. As shown, the service status table includes a "Mobile Network" icon, a "WiFi" icon, and a "not connected" icon, each associated with the voice telephony services, public e-mail/internet services, and private e-mail/internet services. The "Mobile Network" icon, when active, indicates that the associated service is currently available to the handheld communications device 200 via the wireless cellular network 219. The WiFi" icon, when active, indicates that the associated service is currently available to the handheld communications device 200 either via the local area wireless network 221.

The "not connected" icon, when active, indicates that the associated service is currently unavailable to the handheld communications device 200. The "not connected" icon may be active when the user of the handheld communications device 200 is not authorized to receive the associated service, or there aren't any wireless communication modes currently available to the handheld communications device 200.

Preferably, the service status table 1000 also provides configuration information for the available wireless communication modes. For instance, as shown in FIG. 7b, the service status table 1000 includes a long-range network section that provides configuration information for the wireless cellular network 219. As shown, the long-range network section includes a "Mobile Network" heading 1008 which has an associated "EDGE" icon, and "not connected" icon. The "EDGE" icon, when active, indicates that data communication services are available over the wireless cellular network 219 using the EDGE communication protocol. The "not connected" icon, when active, indicates that data communication services are not available to the handheld communications device 200 over the wireless cellular network 219.

The long-range network section also includes a "Mobile Network Provider" heading 1010 which has an associated "Service Provider|Network Provider" subfield, and "not connected" icon. The "Service Provider|Network Provider" subfield indicates the name of the provider of the confirmed data communication service, and the name of the provider of the confirmed wireless cellular network 219. The "not connected" icon, when active, indicates that either that the wireless cellular network 219 is not available to the handheld communications device 200, or that no data communication services are available to the handheld communications device 200 via the wireless cellular network 219.

The service status table 1000 also includes a short-range network section that provides configuration information for the local area wireless network 221. As shown, the short-range network section includes a "Type" field 1012, a "SSID" field 1014, and an "Active Profile" field 1016, each associated with the local area wireless network 221. The "Type" field 1012 indicates the wireless communication protocol (if any) implemented by the local area wireless network 221. The "SSID" field 1014 indicates the name of the provider of the local area wireless network 221. The "Active Profile" field 1016 indicates the profile name defined by the provider of the local area wireless network 221.

The scope of the monopoly desired for the invention is defined by the claims appended hereto, with the foregoing description being merely illustrative of the preferred embodiment of the invention. Persons of ordinary skill may envisage modifications to the described embodiment which, although not explicitly suggested herein, do not depart from the scope of the invention, as defined by the appended claims.

We claim:

1. A method of indicating the availability of services to a wireless communications device, comprising the steps of:
receiving service indications of availability of communication services from a wireless cellular network and a wireless local area network, via wireless non-traffic channels of the wireless cellular network and the wireless local area network without opening traffic channels of the wireless cellular network and the wireless local area network;
when service from the wireless local area network is available to the wireless communications device, issuing a service information request to the wireless local area network over the wireless non-traffic channel of the wireless local area network;
when service from both the wireless local area network and the wireless cellular network are available to the wireless communications device issuing the service information request to the wireless local area network over the wireless non-traffic channel of the wireless local area network;
when service from only the wireless cellular network is available to the wireless communications device, issuing the service information request to the wireless cellular network over the wireless non-traffic channel of the wireless cellular network; and generating a user-indication of availability of communication services from the wireless cellular network and the wireless local area network on the wireless communications device.

2. The method according to claim 1, wherein the user-indication comprises a text information screen depicting a table specifying the availability of the communication services to the communications device.

3. The method according to claim 1, wherein the wireless local area network utilizes a short-range communication protocol.

4. The method according to claim 1, wherein the communication services comprise any of an internet service, an e-mail communication service or a voice telephony service.

5. The method according to claim 1, wherein the service indication comprises an indication of an authorization for use of the communication service.

6. The method according to claim 1, wherein the user-indication is further provided via one of a display icon and a tactile indicator.

7. The method according to claim 1, wherein:
a light emitting diode (LED) on the wireless communications device is flashed to indicate the availability of communication services and the wireless communication mode over which the communication service is currently available to the wireless communications device, the LED being flashed at a first rate when the wireless communications device roams from a first geographic region into a second geographic region and that second geographic region provides a communication mode for the wireless communications device that is unavailable to the wireless communications device in the first geographic region.

8. The method according to claim 7, further comprising prior to receiving the service indications:
transmitting a service information request from the wireless communications device requesting an indication of availability of a communication service at the wireless communications device to a provider of the communication service over the non-traffic channel of an available communication mode of the wireless communications device.

9. The method according to claim 8, wherein:
the LED is flashed at a second rate when the wireless communications device roams from the first geographic region into the second geographic region and that second geographic region does not provide a communication mode for the wireless communications device that was available to the wireless communications device in the first geographic region.

10. A wireless communications device comprising:
a service authorization means for
receiving service indications of availability of communication services from a wireless cellular network and a wireless local area network, via a wireless non-traffic channel of the wireless cellular network and the wireless local area network without opening traffic channels of the wireless cellular network and the wireless local area network;
issuing a service information request to the wireless local area network over the wireless non-traffic channel of the wireless local area network when service from the wireless local area network is available to the wireless communications device;
issuing the service information request to the wireless local area network over the wireless non-traffic channel of the wireless local area network when service from both the wireless local area network and the wireless cellular network are available to the wireless communications device; and
issuing the service information request to the wireless cellular network over the wireless non-traffic channel of the wireless cellular network when the service from only the wireless cellular network is available to the wireless communications device; and
communication mode indicating means in communication with the service authorization means, the communication mode indicating means being configured to provide a user-indication of availability of communication services from the wireless cellular network and the wireless local area network on a display of the wireless communications device.

11. The wireless communications device according to claim 10, wherein the communication mode indication means generates a text information screen depicting a table specifying the availability of communication services to the communications device.

12. The wireless communications device according to claim 11, wherein the wireless cellular network comprises a high-speed short-range communication protocol and the wireless local area network comprises low-speed long-range communication protocol.

13. The wireless communications device according to claim 12, wherein the communication services comprise any of an internet service, an e-mail communication service or a voice telephony service.

14. The wireless communications device according to claim 10, wherein the service indication comprises an indication of an authorization for use of the wireless cellular network or the wireless local area network.

15. The wireless communications device according to claim 10, wherein the user-indication comprises one of a display icon and a tactile indicator for indicating accessibilities of the wireless cellular network or the wireless local area network at the wireless communications device.

16. A tangible computer readable medium carrying processing instructions for a handheld communications device, the processing instructions, when executed by a computer processor of the handheld communications device, enabling the handheld communications device to perform the following steps:
receiving service indications of availability of communication services from a wireless cellular network and a wireless local area network, via a wireless non-traffic channel of the wireless cellular network and the wireless local area network without opening traffic channels of the wireless cellular network and the wireless local area network;
when service from the wireless local area network is available to the handheld communications device issuing a service information request to the wireless local area network over the wireless non-traffic channel of the wireless local area network;
when service from both the wireless local area network and the wireless cellular network are available to the handheld communications device issuing the service information request to the wireless local area network over the wireless non-traffic channel of the wireless local area network;
when service from only the wireless cellular network is available to the handheld communications device, issuing the service information request to the wireless cellular network over the wireless non-traffic channel of the wireless cellular network; and generating a user-indication of availability of communication services from the wireless cellular network and the wireless local area network on the handheld communications device.

17. The method according to claim 3, further comprising:
continuously monitoring the availabilities of the wireless cellular network and the wireless local area network for the wireless communications device; and
upon detecting a condition that the wireless communications device cannot utilize the wireless cellular network but can utilize the wireless local area network, establishing communications for the communication service through the wireless local area network.

* * * * *